United States Patent
Carson, Jr. et al.

(10) Patent No.: US 7,698,331 B2
(45) Date of Patent: Apr. 13, 2010

(54) MATCHING AND RANKING OF SPONSORED SEARCH LISTINGS INCORPORATING WEB SEARCH TECHNOLOGY AND WEB CONTENT

(75) Inventors: Charles C. Carson, Jr., Cupertino, CA (US); Devika Chawla, Dublin, CA (US); James B. Harvey, Mountain View, CA (US); Matvey Nemenman, San Francisco, CA (US); Mohit Sabharwal, Mountain View, CA (US); Marco J. Zagha, Belmont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 217 days.

(21) Appl. No.: 11/334,096

(22) Filed: Jan. 18, 2006

(65) Prior Publication Data

US 2006/0161534 A1 Jul. 20, 2006

Related U.S. Application Data

(60) Provisional application No. 60/645,054, filed on Jan. 18, 2005.

(51) Int. Cl.
*G06F 7/00* (2006.01)
*G06F 17/30* (2006.01)

(52) U.S. Cl. ................................. 707/728
(58) Field of Classification Search ............ 707/728; 999/4

See application file for complete search history.

(56) References Cited

U.S. PATENT DOCUMENTS 4,972,349 A * 11/1990 Kleinberger ............... 707/1

(Continued)

FOREIGN PATENT DOCUMENTS

KR 10-0311355 11/2001

(Continued)

OTHER PUBLICATIONS http://www.googlerank.com/ranking/Ebook/glossary.html, relevant information verified in existance as early as Dec 5, 2004.*

(Continued)

*Primary Examiner*—Pierre M Vital
*Assistant Examiner*—Jason Liao
(74) *Attorney, Agent, or Firm*—Nathan O. Greene; Brinks Hofer Gilson & Lione

(57) ABSTRACT

A system is disclosed for generating a search result list in response to a search request from a searcher using a computer network. A first database is maintained that includes a first plurality of search listings. A second database is maintained that includes documents having general web content. A search request is received from the searcher. A first set of search listings is identified from the first database having documents generating a match with the search request and a second set of search listings is identified from the second database having documents generating a match with the search request. A confidence score is determined for each listing from the first set of search listings wherein the confidence score is determined in accordance with a relevance of each listing when compared to the listings of the second set of search listings. The identified search listings from the first set of search listing are ordered in accordance, at least in part, with the confidence score for each search listing.

26 Claims, 6 Drawing Sheets

U.S. PATENT DOCUMENTS

| | | | |
|---|---|---|---|
| 6,269,361 B1 * | 7/2001 | Davis et al. | 707/3 |
| 6,622,140 B1 * | 9/2003 | Kantrowitz | 707/5 |
| 7,197,497 B2 * | 3/2007 | Cossock | 707/7 |
| 7,257,570 B2 * | 8/2007 | Riise et al. | 707/3 |
| 2002/0169764 A1 * | 11/2002 | Kincaid et al. | 707/3 |
| 2003/0046161 A1 | 3/2003 | Kamangar et al. | |
| 2004/0093327 A1 * | 5/2004 | Anderson et al. | 707/3 |
| 2006/0155751 A1 * | 7/2006 | Geshwind et al. | 707/102 |

FOREIGN PATENT DOCUMENTS

| | | |
|---|---|---|
| WO | WO 03/010689 A1 | 2/2003 |
| WO | WO 2004/028234 | 4/2004 |
| WO | WO 2004/111771 A2 | 12/2004 |

OTHER PUBLICATIONS http://www.law.uconn.edu/homes/swilf/ip/cases/playboy.htm.*

Howe, Dennis, Free Online Dictionary of Computing, HTML, May 9, 1997, Available: http://foldoc.org/index.cgi?query=relevance (Accessed May 11, 2008).* http://en.wikipedia.org/wiki/Hidden_Markov_model.*

Weisstein, Eric W. "Markov Process." From MathWorld—A Wolfram Web Resource. http://mathworld.wolfram.com/MarkovProcess.html.*

Coifman et al, Multiresolution Analysis Associated to Diffusion Semigroups: Construction and Fast Algorithms, Registered with the USPTO as part of U.S. Appl. No. 60/582,242, filed Jun. 23, 2004, pp. 29-60 of said provisional application.*

International Search Report and Written Opinion in PCT/US06/01857 filed Jan. 18, 2006, dated Dec. 18, 2007 (Note that U.S. Patent No. 6,269,361 B1 to Davis et al. and U.S. Patent Application Publication No. 2002/0169764 A1 to Kincaid et al. are both referenced herein), 12 pages total.

Preliminary Rejection from corresponding Korean Application No. 10-2007-7018836, dated Mar. 17, 2009 ( 4 pages).

Supplementary European Search Report for related European Application No. 06718865.6, dated Nov. 30, 2009 (7 pages).

* cited by examiner

FIG. 5

MATCHING AND RANKING OF SPONSORED SEARCH LISTINGS INCORPORATING WEB SEARCH TECHNOLOGY AND WEB CONTENT

RELATED APPLICATIONS

This application claims the benefit of U.S. Provisional Application No. 60/645,054, filed Jan. 18, 2005, the entire contents of which are incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The transfer of information over computer networks is an important way by which institutions, corporations, and individuals conduct business. Computer networks have grown over the years from independent and isolated entities established to serve the needs of a single group into vast internets that interconnect disparate physical networks and allow them to function as a coordinated system. Currently, the largest computer network is the Internet, a worldwide interconnection of computer networks that communicate using a common protocol.

The Internet has transformed into a global marketplace of goods and services, driven in large part by the introduction of the World Wide Web ("the web"), an information system. Computers connected to the Internet may access web pages via a browser program, which has a powerful, simple-to-learn graphical user interface. In a web-based search on an Internet search engine, a user enters a search term of one or more keywords, which the search engine then uses to generate a listing of web pages that the user may access via a hyperlink.

The search engine functionality of the Internet should be focused to facilitate an on-line marketplace that offers searchers quick, easy and relevant search results while providing Internet network information providers with a cost-effective way to target consumers. A consumer utilizing a search engine that facilitates this on-line marketplace finds companies or businesses that offer the products, services, or information that the searcher is seeking. In the on-line marketplace, companies providing products, services, or information may bid in an open auction-based ranking environment for ranks on a search result list generated by an Internet search engine.

Operators of some auction-based search engines may be losing potential revenue, such as by being unable to show enough sponsored results for certain search terms. In addition, irrelevant results and/or lower effective revenues from the results may occur. Some operators may not be able to tightly control trade-offs between relevance and coverage of the results. Likewise users' needs may not be met for search queries of a commercial intent. Irrelevant results may be shown if sponsored results are shown based only on some of the users' query terms. Moreover, advertisers may experience low traffic with some auction-based search engines. The advertisers may carry a burden of generating bidded terms corresponding to their web pages to try to maximize relevant search traffic to their sites. Missed opportunity to provide high quality matches to specific queries may occur. Likewise, many users may access the advertiser's site but not purchase anything because the result turned out to be irrelevant. As such, advertisers' may pay for click-throughs from a user that had a low probability of an item being purchased

BRIEF SUMMARY

A system generates a search result list in response to a search request from a searcher using a computer network. A first database may be maintained that includes a first plurality of search listings, wherein each search listing may be associated with one or more search terms. A second database may be maintained that includes documents having general web content. A search request is received from the searcher. A first set of search listings is identified from the first database having documents generating a match with the search request and a second set of search listings is identified from the second database having documents generating a match with the search request. A confidence score is determined for each listing from the first set of search listings wherein the confidence score is determined in accordance with a relevance of each listing when compared to the listings of both sets of search listings. The identified search listings from the first set of search listing are ordered, at least in part, in accordance with the confidence score for each search listing.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 5 illustrates an exemplary screen shot of a web page that may be returned to the user.

DETAILED DESCRIPTION OF THE DRAWINGS AND THE PRESENTLY PREFERRED EMBODIMENTS

A system may combine analysis of advertiser sponsored listings, advertiser web site content, world wide web content, query intent, and/or user behavior statistics to deliver relevant matches, such as sponsored matches, and associated properties of a query and result. As used herein, the term relevant includes results that generate revenue for a search provider, a depth or broad range of results, and/or results relevant to a searcher. The system may analyze in combination the results of a search query provided by more than one server. A relevance or quality of results from a first search query may be determined in accordance with results of a separate, different search query.

Figure 1:
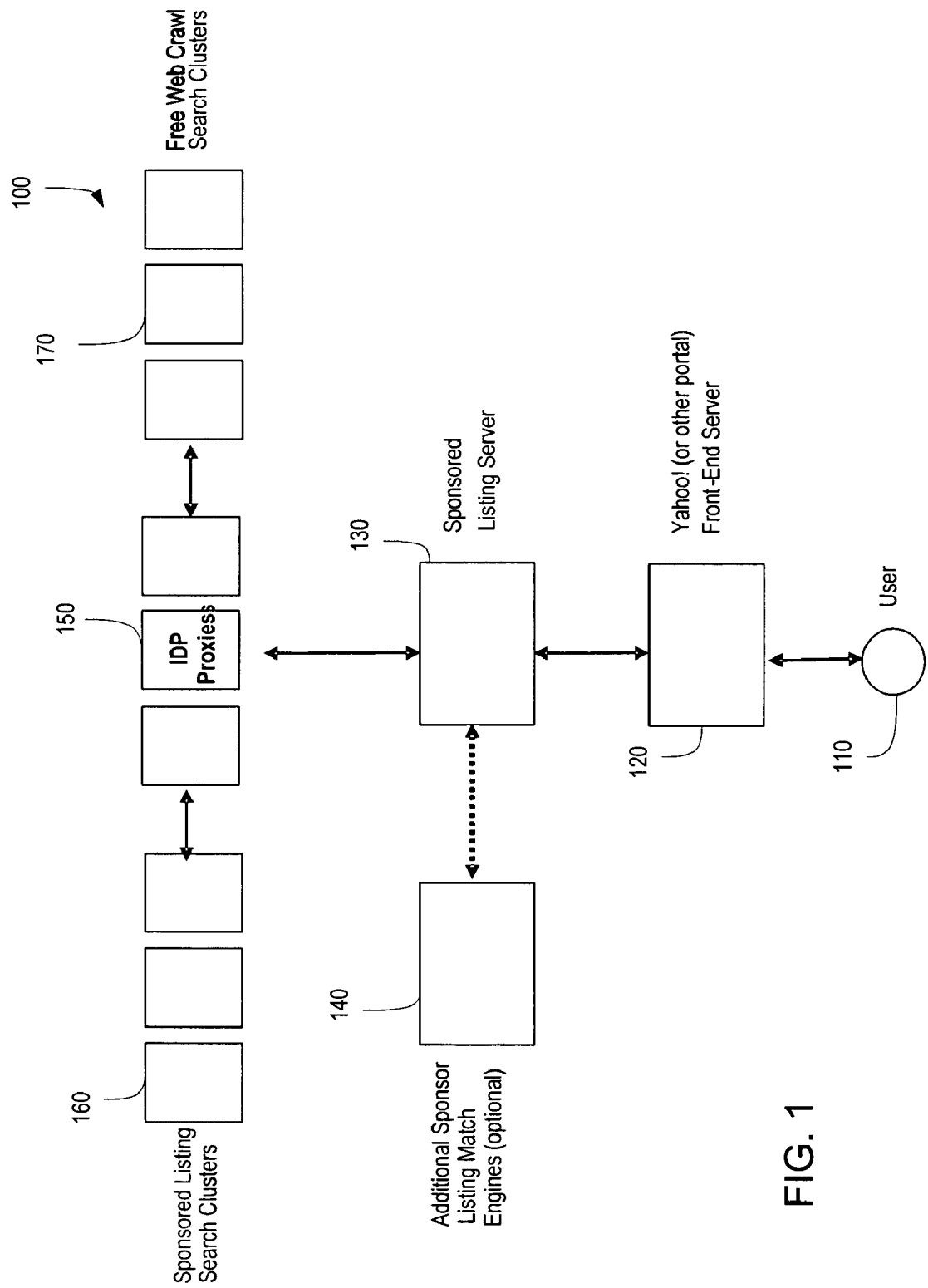
FIG. 1 illustrates a system for providing results to search queries.

FIG. 1 illustrates a system 100 for providing results to search queries. A searcher, such as user 110, submits a search query using a web browser to access a front-end server 120, such as YAHOO or OVERTURE. The query may include one or more terms. The front end server 120 may send the search query to a first backend server 130 such as a sponsored listings server or other type of server. The sponsored listings server may provide results to the search query that include advertisers that pay to be included in the results. The first server 130 may access a sponsored listing match engine 140. The sponsored listing server 130 may connect with IDP proxies 150 to handle incoming search queries. The IDP proxies 150 may connect with different search clusters such as sponsored listing search clusters 160 and free web crawl search clusters 170.

Figure 2:
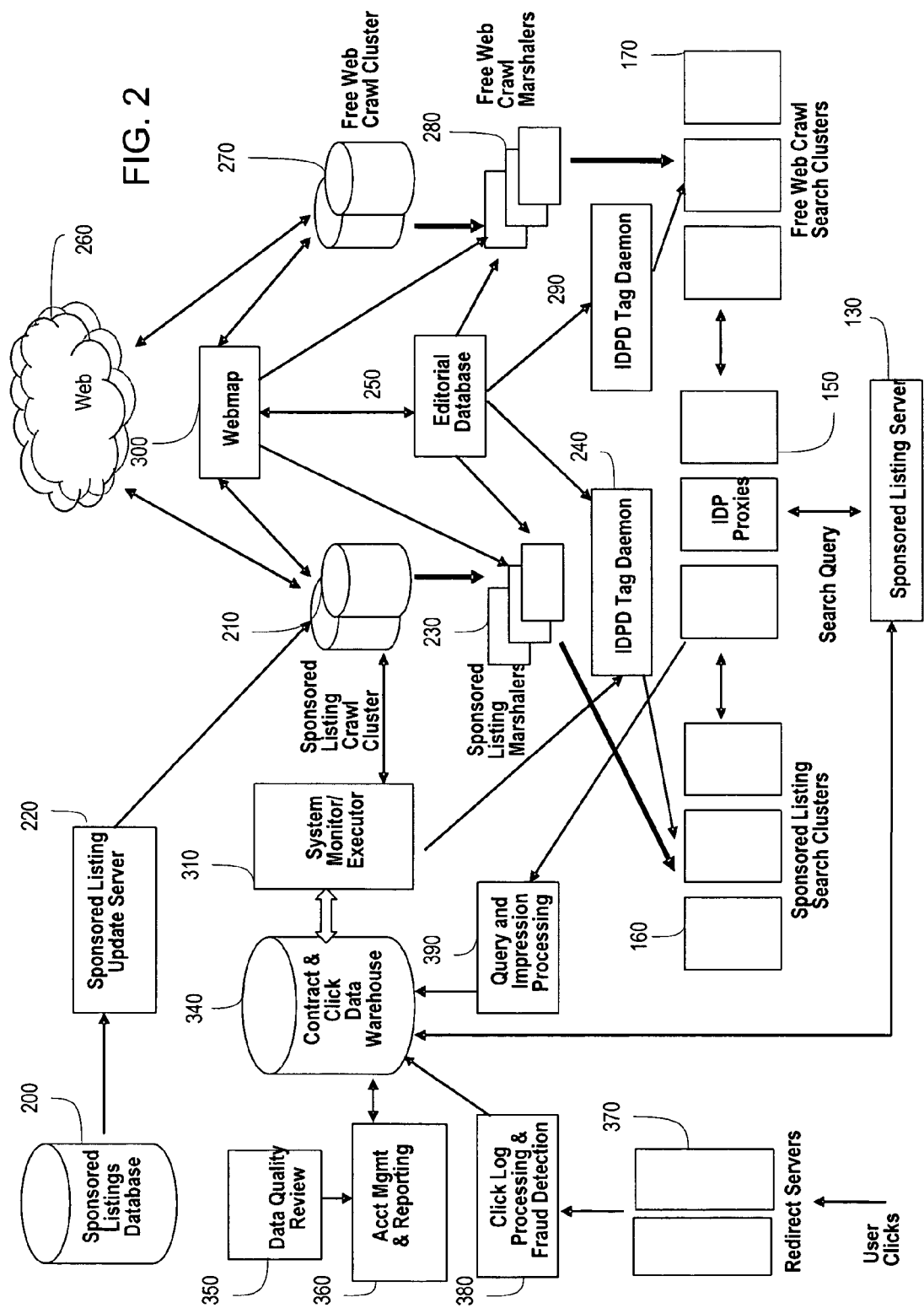
FIG. 2 shows a system for managing queries and database content.

FIG. 2 shows a system for managing queries and database content. The sponsored listing server 130 may utilize results from the sponsored listing search clusters 160 and the free web crawl search clusters 170. The sponsored listing search clusters 160 may obtain listings from a sponsored listing database 200. The sponsored listings database 200 may be used when the sponsored listings server 130 is operated by an entity different from the operator of the free web crawl search clusters 170. The operator of the sponsored listings server 130 and the free web crawl search clusters 170 may also be the same entity.

To obtain listings from the sponsored listings database 200 the system 100 may perform context indexing. The context indexing may include capturing a snapshot of a sponsored listings database 200 for determining listings eligible for an advanced match. Eligible listings include listings whose advertisers have agreed to have their listings displayed using the algorithms of the system 100. Information from the listings database may be transferred to a sponsored listing crawl cluster 210 such as via a sponsored listing update server 220. Sponsored listing marshalers 230 may be used to create indexes of the content. An IDPD Tag Daemon 240 may be used to mark a quality of the indexed pages based, for example, on editorial considerations such as removing spam listings, links to listing that do not work and links with a low rate of click-through. The IDPD Tag Daemon 240 may obtain editorial content from an editorial database 250. Listings may be indexed with associated annotations, crawled content, anchor text such as text associated with inbound links to the target page, or algorithmically generated summaries and keywords.

To obtain documents for the free web crawl search clusters 170, content is gathered from web 260 via the free web crawl cluster 260 and free web crawl marshalers 270. Editorial material may be provided from the editorial database 250 to documents at the free web crawl marshalers 280. Editorial material may also be provided at the free web crawl search clusters 170 from the editorial database 250 via an IDPD Tag Daemon 290. A webmap 300 may be used to provide information to, and receive information from, the sponsored listing crawl cluster 210, the free web crawl cluster 270, the editorial database 250. the sponsored listing marshalers 230 and the freeweb crawl marshalers 280. The webmap 300 may provide information about hosts and hyperlinks on the web, including anchor text associated with hyperlinls.

The marshalers 230 and 280 produce indexes or search databases used by the search clusters 160 and 170 to respond to search queries. A search database of free web content or general web content may be used to determine the quality of results from a search database of sponsored listings.

Transfer of sponsored listings to the web crawling/indexing system may be accomplished using a transfer protocol such as XML encoding. Requests and responses from a search provider to a web search system may be accomplished with a protocol such as IDP (INKTOMI Data Protocol) 2.0 and transfers may be accomplished by hyper text transfer protocol (http). An incremental update protocol may be used for the efficient transfer of sponsored listings such as by only transferring those listing that have changed since the last transfer. Properties of the listings may be converted to appropriate representations for the web search database. Conversion to indexable web content may be accomplished using XSLT transformation.

Sponsored listings may be submitted with a display title, display abstract, display hostname, destination URL, crawl URL, bidded terms, account id, ad group, historical CTR, and the like. For simplicity, the advertiser may submit a set of crawl URLs or root URLs pointing to a tree of web pages, without specifying the titles, abstracts, and bidded terms. Alternatively, or additionally, an advertiser can specify that there is no content to be crawled for a listing, if the advertiser provides a title, abstract, display hostname, and destination URL for the listing. Multiple listings may use the same crawl URL. An advertiser may submit multiple title and abstract combinations for the same URL and bidded terms, along with an optional specification of how to choose among similar titles and abstracts, for example, by specifying the relative display frequencies or requesting that the system optimize the choice for improved click-through and/or conversion.

Multiple listings may be grouped in the sponsored listings database by, for example, account, URL, related group of URLs, and/or bidded terms, in order to improve performance of indexing, retrieval, and/or accounting. For efficiency, a crawl URL shared by multiple listings may be crawled only once. Other amounts of crawls may also be used.

Non-indexed properties associated with a listing such as a cost to an advertiser when a user 110 clicks the listing, an account/listing ID, and negative keywords may be included in the listings. Negative keywords include terms chosen by an advertiser such that, if the term is part of a search query, an advertiser's listing will not appear. In addition to converting properties of the listings, documents may be annotated with helper words to be indexed, such as by adding stemming variants, synonyms, and/or related terms based on the bidded terms, title, abstract, URL, and/or crawled content for a listing. A new section of the document may be created to add alternate terms to the listing, such as by adding 'shoe' and 'shoes', 'running' and 'run' or other variants of terms, and the like.

The system 100 may handle search queries from the user 110 by providing results to the search query in accordance, at least in part, with result relevance scoring, such as a confidence score, and/or with ranking criteria. Search results from the sponsored listing search clusters 160 and the free web crawl search clusters 170, or other database, may be performed, and the results compared to determine results to be displayed to the user.

When the user 10 enters a query, the query may be processed by the proxies 150. At the proxies 150, the system 100 may edit the query in ways such as auto-correction for misspelled queries, segmentation of the query into words and phrases, changing case, using concept expansion, and removing less important words, such as based on occurrence frequencies in historical query logs and/or web pages. The system 100 may transform the user query into a preferred form for a back-end query search engine. Depending on an implementation, no results may be returned if the query or transformed query match terms on a list of objectionable terms. For example, no results may be returned if the query contains objectionable terms such as terms associated with videos related to beheadings, adult content, and the like. The objectionable terms may be decided on by an editor of the search engine as a matter of policy or others such as advertisers or automatic adult classifiers. A list of required query phrases may be provided by an editor or advertiser, or generated by an algorithm, and these phrases may be associated with a listing, multiple listings, or all listings from an account or domain. If one or more search terms associated with a sponsored listing contains a required phrase that is not contained in the user query, the listing may be excluded from the set of results for that query.

The modified query may be issued to the sponsored listing search clusters 160 and at least one other search cluster, such as the free web crawl search clusters 170 that search for general web content. The free web crawl search clusters 170 may search a full-scale web index or a portion of the full-scale web index chosen in accordance with determined parameters. The full-scale web index may include, for example, 10 billion results while a sample portion of the index may include 200 million results for simplified processing, speed, and/or to increase the relevance to the user 110 of the results. The web content may be sampled by including documents based on properties of the web links such as by using links that are accessed more frequently than others.

Information may be provided to the sponsored listing search clusters 160 via system monitor/executor 310, such as from a sponsored listings search provider 330. The sponsored listings search provider may utilize a contract & click data warehouse 340 to maintain data on sponsors and the clicks that occur to the sponsors' websites. The data warehouse 340 may receive information about listings from data quality review module 350, such as via an account management and reporting module 360. Information about user clicks to a website may be received via redirect servers 370, for example, after being processed by click log processing and fraud detection module 380. The data warehouse 340 may also receive information about the queries issued by users and results shown to users from Sponsored Listing Servers 130 and/or IDP proxies 150 via query and impression procession module 390. The computer processing with reference to the servers, databases, and modules as disclosed with reference to FIG. 2 and throughout the application may be performed through processor-executable code located on a processor-readable medium.

The sponsored listing search clusters 160 may provide results in a first way, such as results of advertisers that pay to be included in the sponsored listing database, ranked, for example, by revenue that the results bring to the search provider. The free web crawl search clusters 170 may provide results in another way, such as all possible results or a portion of all possible results whether or not advertiser related, ranked, for example, by popularity. Results of a search of the sponsored listing database may be compared with results of the general web content database, and the results having top ranks from the sponsored listing database may be displayed if the results also occur within top ranks of the results for the general web content database. A relevance or confidence score regarding a relevance of the documents may also be used for optimizing placement on the results page, for example, whether the listing should be shown to the user 110 at a top, side, or bottom of the page. Sponsored results may also be re-ranked or removed as being a duplicate based on a comparison of sponsored listings and web results.

The system 100 may also use various scoring parameters for the sponsored listing database query. For example, modified weights may be used for different parts of the search result document. For example, a search term occurring in a title of the document may be considered more important than if the search term only occurred in the body of the document.

Relevant results may be determined for each database and the combined results may be sorted by the relevance or confidence score. The relevance score may be based on many factors including a presence of query terms, proximity of the query terms to each other, matching of query terms to document anchor text, a document category, and determined measures of document quality. The sponsored listing database results that occur in the set of sorted top results may be further modified such that results where negative keywords match query occur may be discarded. In addition, if the query contains terms on a list of designated trademarked terms, any result that does not contain all trademarked terms in a visible portion of result or the bidded terms for the listing may be discarded.

Features for the results from the sponsored listing database may be calculated to help determine which results are to be displayed. The features include an actual cost to the advertiser for a user 110 to click the result based, for example, on bid rankings. The features may also be determined in accordance with other factors such as historical click-through and conversion data. Historical click-through data includes information on the number of times a user 110 clicks through to the advertisers' site when the site is provided as a result. Conversion data includes information from the advertiser regarding whether the user 110 performed an action desired by the advertiser, such as making a purchase when the user 110 visiting the advertiser's site. Other features include rank of the result in the full sorted set of top results from the combination of the sponsored listing database and general web content database and a relevance score difference and ratio from top results of the general web content database. Other features of the result include whether the query word/phrase appears in the title, abstract, URL, display host, bidded keyphrase, and/or algorithmically generated keywords or summaries of the result.

Individual features may be analyzed alone or in combination to increase a composite confidence that the result is a good match to the query. The features may also be used to create a confidence score for each result, and the sponsored listing server 130, or other server, may sort the results based on the score such that results that receive a higher score are displayed first on a list of search results displayed to the user. The sponsored listing server 130 may return properties of the input query, such as a categorization of the query, and may return properties of each listing, such as keywords associated with each listing. Functions for relevance scoring and reranking functions may be constructed entirely or in part by machine-learning methods, such as methods to find coefficients of linear formulas, methods to construct decision trees, methods to construct Support Vector Machines, neural networks, Bayesian networks, or other methods. Features, combinations of features, and scoring and reranking functions may be constructed with the aid of historical click and impression data and/or editorially labeled relevance judgments.

In accordance with the confidence score, and other factors, such as whether the search provider desires to display more relevant results and/or more revenue generating results, the results to be displayed may be determined. Real-time reporting of the matching statistics may be provided so that the features determining the confidence score may be modified for a particular search provider. The listing ID may be returned to the search provider along with the confidence score for each web search database result. The listing ID for the web search database results may be used to lookup current title, abstract, display hostname, cost to advertiser for click-through, and listing/account status. The matching of listings may be decoupled based on crawled and indexed content, which may be hours or days old, from the retrieval of the current title, abstract, URL, CPC, and listing/account status.

Results determined to be the most relevant in view of any combination of the above-described feature may be displayed. If the advertiser has supplied multiple alternative titles and abstracts for a listing, the choice of title and abstract to be displayed may be made based on relevance to the query, click-through statistics, and/or specification of the desired frequency of display of each title and abstract. Terms in listing in accordance with the query and transformed query may be highlighted for the user. Eligible results may be blended with exact matching and other algorithms based on combination of cost to the advertiser for each click-through, relevance scores and/or preference rules. Flexible policies may be implemented for the tiering or mixing results generated by the system 100 with matches from other systems. Redundant results may be removed based on a combination of account id, the domain name, hostname extracted from the crawl URL, display URL, display hostname, and/or the like.

Figure 3:
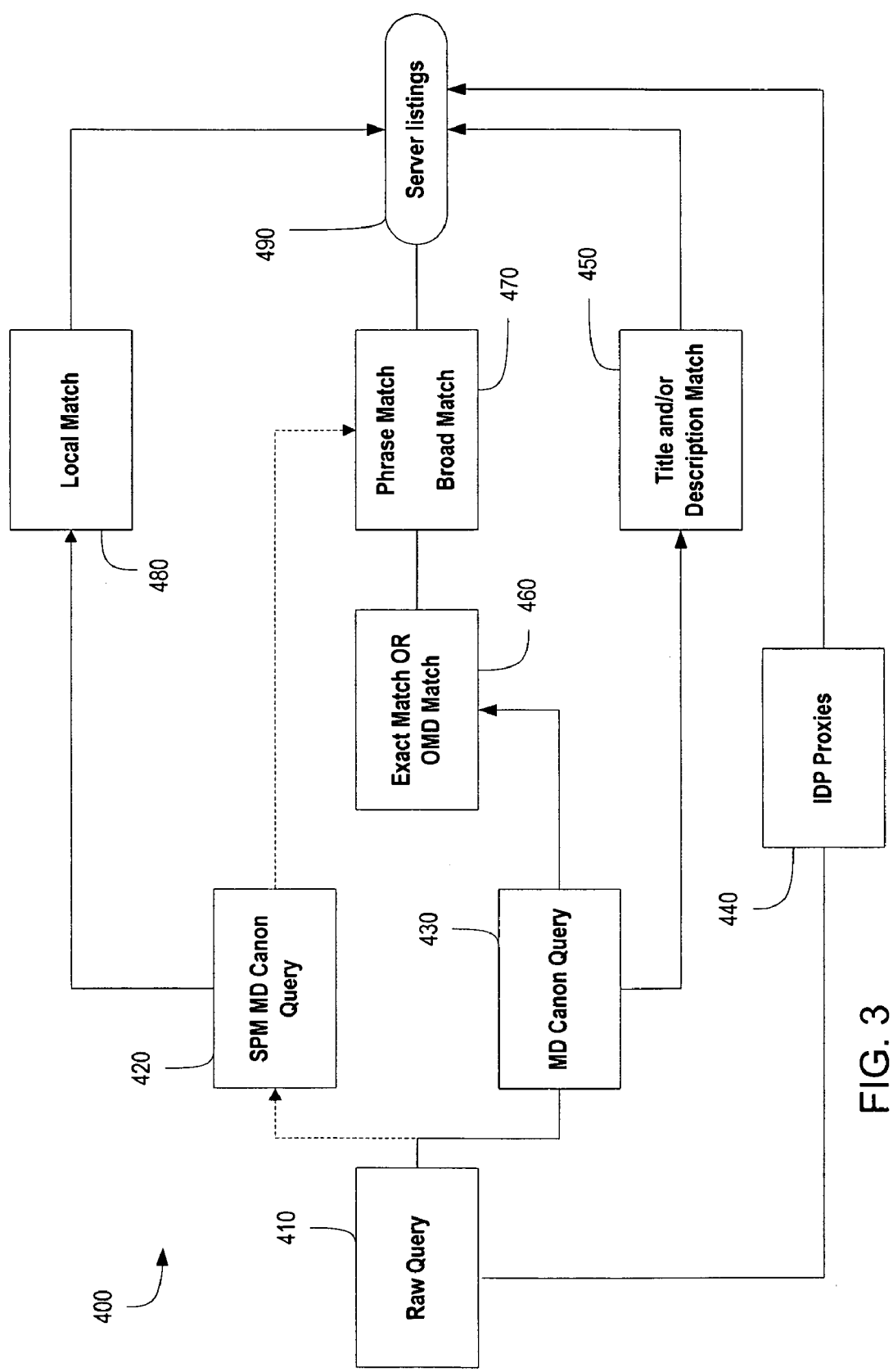
FIG. 3 is a block diagram of an exemplary search pipeline.

FIG. 3 is a block diagram of an exemplary search pipeline 400. At block 410 a raw query is received from the user 110. The raw query may processed, such as with a sub-phrase match (SPM) match driver (MD) canonical (canon) query module at block 420 and/or MD canonical query module at block 430, to determine other variations of the terms in the query, remove superfluous terms or endings, such as plural endings or 'ing' endings, and determine synonyms for the raw query. The raw query may be sent to IDP proxies at block 440. The MD canon query may be sent to a title and/or description match server at block 450. The MD canon query 430 may also be sent to an exact match or orthographic match driver (OMD) match at block 460. Results of the exact match or OMD match may be sent to a phrase match or broad match server at block 470, along with results from the SPM MD canon query. The SPM MD canon query results may also be sent to a local match server at block 480. The results from all the servers 440, 450, 470 and 480 may be sent to a server listings module at block 490. Each listing is analyzed to determine a confidence rating of the listing that the listing is relevant.

An exemplary core matching algorithm for the system 100 follows:

A "full result set" is a blended set of the top num_candidate results from a sponsored listing database and other databases, ranked by a relevance score. Each result from the sponsored listings database within the full result set may be rescored and reranked by computing a number of "demotion" terms that attempt to capture non-ideal characteristics of a result.

Using each item's "rank" and normalized "score" in the full result set:

rank_demotion=log2(rank)

rawscore_demotion=1−score/top_score where top_score is the score of #1 result in full result set.

Weights of each query word may be set as 1.0 by default, but may be overridden to any value between zero and one.

Based on word weights, max_query_score is the sum of weights of each unique query word.

Three metrics may be computed separately for each "section", where "section" is the listing title, abstract, bidded terms, or list of key topics for the listing. If an "editorial_switch" parameter is 1, then the bidded terms may be considered to be empty for listings that have not been editorially reviewed. The absence_demotion, edit_distance_demotion, and order_distance_demotion may be determined as follows:

absence_demotion=(max_query_score−match_weight)/max_query_score, where match_weight is the weighted sum of unique query words in the section edit_distance_demotion=(max_query_score−max)/max_query_score, where max may be the maximum weighted sum of unique query words among sequences of consecutive section words in section that are all query words order_distance_demotion=

0 for 1-word queries, 1 if no query words appear in section, otherwise computed as 1−(ordered_words−1)/(nunique_query_words−1), where ordered_words may be determined by ignoring non-query words in section and finding the maximum number of unique ordered query words.

When determining, such as by computing, the section demotion for a list of sections, the minimum demotion of any section may be used for each of the three demotion types:

section_demotion (section_list)= edit_distance_demotion weight*min_of_sections(edit_distance_demotion)

+order_distance_demotion_weight*min_of_sections (order_distance_demotion)

+absent_words_demotion_weight*min_of_sections (absence_demotion)

The "editorial demotion" may be 1 to denote a listing that has not been editorially reviewed, or 0 otherwise. Other notations may be used.

The final relevance score may be determined as:

relevance_confidence= base_confidence

−rawscore_demotion*rawscore_weight

−rank_demotion*rank_weight

−section_demotion(title, abstract)*title_abstract_weight

−section_demotion(bidded_term)*bidded_term_weight

−section_demotion(title, abstract, bidded_term)*title_abstract_bidded_term_weight —section_demotion(topics)*topics_weight −editorial_demotion.*editorial_weight To determine actual_cpc (where cpc is cost per click) for each sponsored result, sponsored results may be sorted by the bid_cpc associated with each result. Any result with a bid_cpc less than min_bid_cpc may be assigned an actual_cpc equal to its bid_cpc. Otherwise, the bottom result may be assigned an actual_cpc of its bid_cpc and each other result is assigned an actual_cpc of the next result's bid_cpc plus cpc_increment, subject to the constraint that actual_cpc may not exceed bid_cpc.

Results with a relevance_confidence below min_relevance_confidence may be rejected. Remaining results may be reranked by a ranking_score determined as follows:

if actual_cpc≦cpc_knee, then cpc=actual_cpc otherwise, cpc=(cpc_knee+cpc_slope*log2(actual_cpc+1))/100)

ranking_score=relevance_confidence+ cpc_weight*cpc.

Alternatively, the ranking_score may be determined as follows:

if actual_cpc≦=cpc_knee, then cpc=actual_cpc otherwise, cpc=cpc_knee ranking_score=relevance_confidence+ cpc_weight*cpc.

Figure 4:
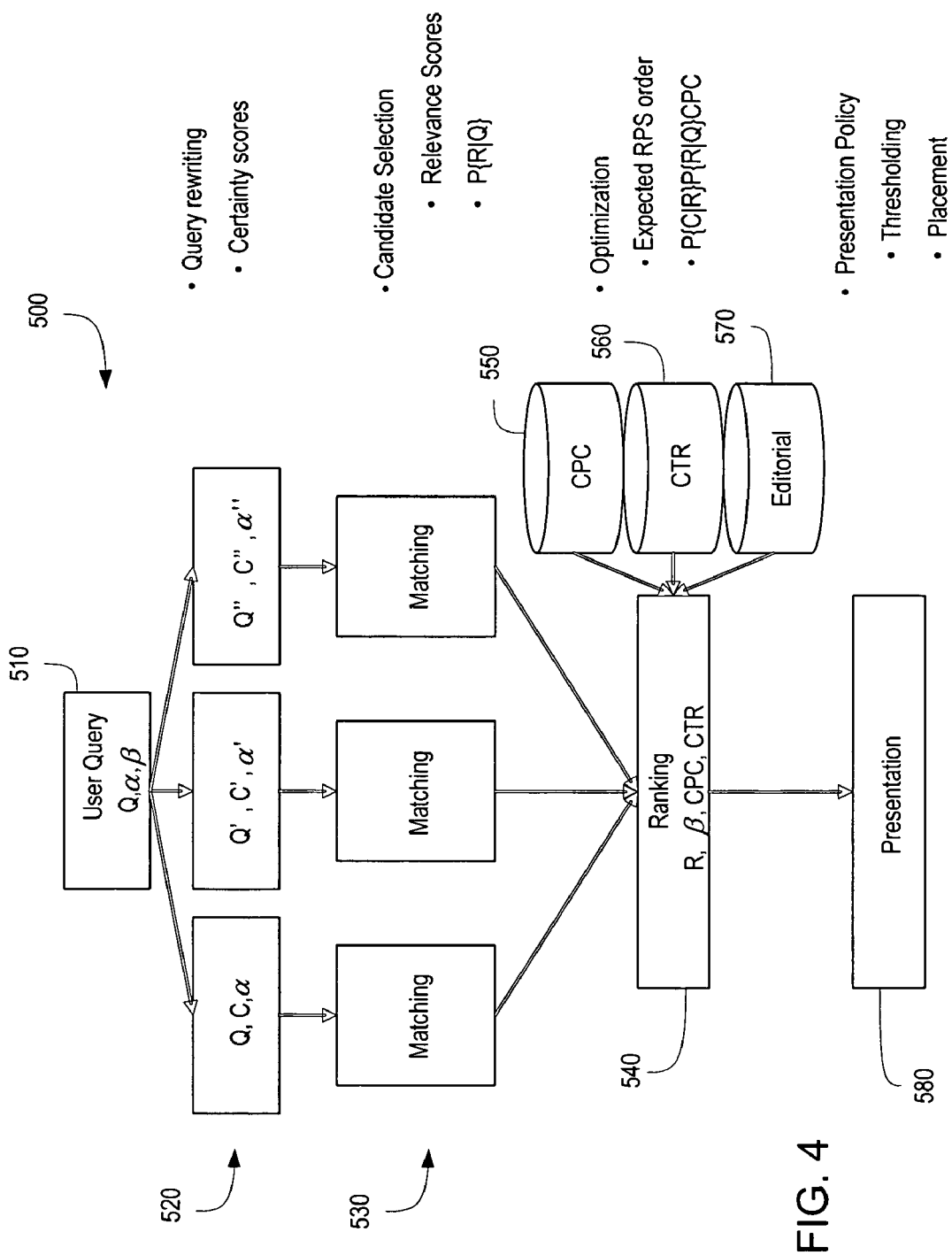
FIG. 4 is a block diagram illustrating an architecture for presenting a combined set of listings from listings of a variety of servers.

Exemplary combination of settings for tunable input parameters for the US market:
  0.05 rank_weight
  0.24 rawscore weight
  0.45 title_abstract_weight
  0.0 bidded_term_weight
  0.1 title_abstract_bidded_term_weight
  0.01 topics_weight
   0.2 edit_distance_demotion_weight
   0.3 order_distance_demotion_weight
   0.5 absent_words_demotion_weight
   0.95 base_confidence
   0.01 editorial_weight
   1 editorial switch
   2.0 cpc_weight
   100 num_candidates
   0.35 min_relevance_confidence
   $0.10 min_bid_cpc
   $0.01 cpc_increment.
   $0.20 cpc_knee
   $1.00 cpc_slope FIG. 4 is a block diagram illustrating an architecture 500 for presenting a combined set of listings from listings of a variety of servers. A user query is received at block 510. At block 520, the query is sent to different search servers. Variations of the query may be sent to the different servers. Certainty scores may be attached to each variation of query, as a probability that the variation will return a relevant result. At block 530, the search servers match listings to the query. A certainty score may be attached to the listings that the listing is a relevant match. At block 540, the listings are ranked such as in accordance with the certainty scores and other factors such as cost per click (block 550), click through rates (block 560) and based on editorial considerations (block 570). At block 580, the listing may be presented in accordance with the rankings and other factors. The listing may be shown in order of confidence, such as with the highest confidence rated listing being shown first and/or at a particular area of displayed browser page.

Figure 5:
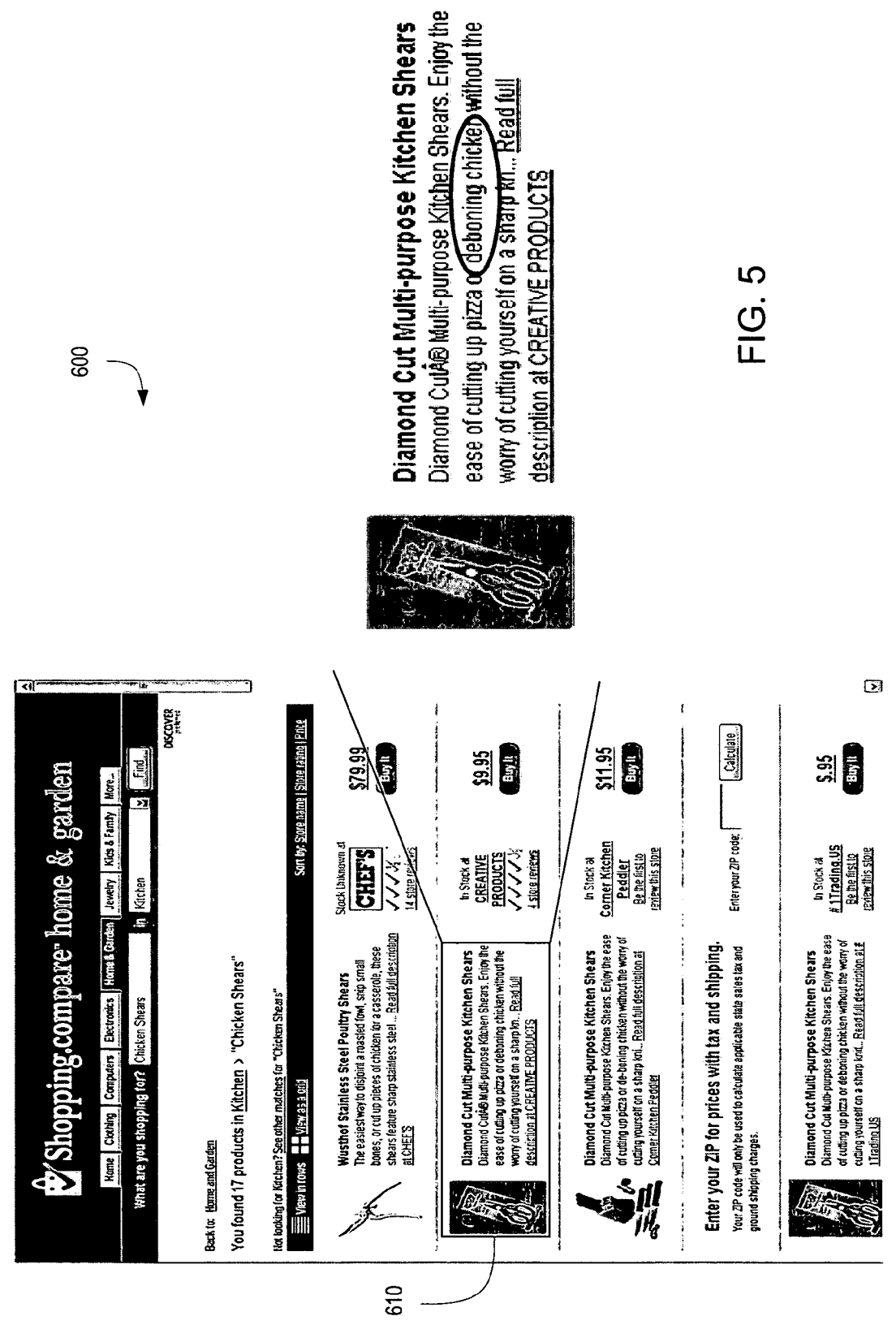

FIG. 5 illustrates an exemplary screen shot 600 of a web page that may be returned to the user. If the user 110 enters the terms 'deboning chicken' there may be no sponsored results with that term. Since the system 100 compares results from the web search database and the general web content database, a result like 'Chicken Shears at Shopping.com' may be discovered. When connecting to the link, the user 110 may observe a result such as 'Diamond Cut Multi-purpose Kitchen Shears' that does not include either the terms 'deboning' or 'chicken' in the title.

The system 100 may be customized to address varying needs of different search provider. Sponsored listings may be scored differently than general web documents, for example, to either place more or less emphasis on the sponsored listings. Crawl frequecies for updating the web search database may be changed, such as from weeks to days, depending on a desired freshness of the content in the database. Tunable parameters may be provided for individual matching criteria. Results may be restricted to those where all the query terms are present in determined portions of the results, such as the title or the abstract. Stopwords such as 'a', 'the' and 'and' may be excluded or given less weight. Some query terms may be weighted as being more important than other terms. The system 100 may be tunable: for instance, the query terms may have different weights for different search providers. For example, the term 'picture' may be weighted as being half as important as other words. Results may be ranked relative to web content without requiring retrieval of the full web content listings, such as the title and abstracts. Results sets may be cached to reduce latency and lower serving costs.

The system 100 may also include other features to help improve relevance and/or revenue such as by using historical click-through data regarding the number of users 110 that accessed an advertiser's site and conversion data regarding the number of users 110 that purchased items from the advertiser's site. The data may be aggregated per URL, domain, or contract for all queries, or for specific queries and query terms.

Queries from the user 110 may be modified such as by editorially determining rewrites for specific queries or query terms, or by algorithmically determining rewrites. Certain query terms may be deleted or reduced in weight. Related terms and synonym expansion of the term may be added to the query and weighted accordingly. The system 100 may also expand query terms and add stemming variants, such as by adding or removing 's' and 'ing' to the term, and abbreviation variants of the term may be added to the query. Queries may be segmented into phrases for better proximity scoring of the terms. For example, the terms 'New' and 'Mexico' may be grouped together to get results for the state 'New Mexico'. Queries written without spaces separating words, such as in Chinese queries, may be segmented into words. Compound words, such as in Korean or German queries, may be segmented into component words. Script variants may be allowed such as for Asian languages, such as variants in the Chinese language. A list of terms may be generated to use for hit-highlighting in accordance with rewrites of the term. For example, when the results are displayed, the search terms may be highlighted to aid the user, and variants of the search term may also be highlighted. For the search term 'S.F. opera' the variant 'San Francisco opera' may also be highlighted when the results are displayed.

The system 100 may also modify content of the web page results stored in the web search database and/or the general web content database. Page content may be thinned or increased, based on many factors including page structure, page template extraction, for example, applied to a collection of documents associated with a contract, feed, or site, and click and conversion statistics per the query or query term. Prices may be added to the web page description to avoid irrelevant matches. Synonyms, alternate spellings, stemming variants, abbreviation variants, and related terms may also be added to the web page description.

The system 100 may also be configured to accommodate other features. Components requiring development, such as query classification, spelling correction, and query rewriting, may be added to the system 100. Relevance tuning may be allowed for region and language preferences. Region-specific scoring may be implemented such that query results tied to a particular region are weighed higher for a user 110 from that particular region. Personalization data may be incorporated into relevance scoring, using many factors such as content preferences, user location, user demographics and query history. The search provider may be allowed to control whether results should be weighted towards those that appear more relevant or whether a greater coverage/depth of results is preferred. Editorial judgments, positive or negative, may be incorporated for sponsored listing data based on URLs, domains, or contracts. Sponsored listings feeds may be used to automatically generate bid terms and bid amounts for related listings. The system 100 may be used for implementing exact match to bidded terms in order to lower serving cost and to incorporate relevance ranking of exact match listings based on factors used for inexact match, such as web content.

Other features of the system 100 include the ability to determine results sets editorially, by specifying complete results sets or specific results to include, exclude, promote, or demote. The system 100 may incorporate current advertiser budget in selection and ranking of results. For example, if the advertiser has used up a determined percentage of its budget, a result for that advertiser may not be shown unless the result ranks above a certain rank, even if the result would otherwise have been displayed. Local/geographic queries, domain queries, and product number queries may be scored differently. For example, results that otherwise may not have been displayed, are given extra weight and are shown because a local query has occurred.

A queue of listings or query-listing pairs to be editorially reviewed may be automatically generated based on several factors including click data, conversion data, query or query-term frequency, listings display frequency, listing bid amounts, results of previous editorial reviews (if any), and user complaint frequency, and may be aggregated by account, domain, query, or query term. Representative web content may be selected and used for generating relative ranks of web search database content using factors other than the frequency of a selection including, for example, optimizing coverage by language, region, content-type, internet domain, topic, and vocabulary used.

The system 100 may be adapted to show offers other than sponsored listings, such as auction listings, job offers, etc., and to evaluate relevance of those offers relative to a content database other than generic web content, such as a database driving a vertical search or directory such as travel, shopping, etc. Other content attributes in relevance evaluation may be incorporated, such as prices, availability, duration of offer, popularity, vendor rating, and product details such as size, color and trim. The system 100 may be used to determine when and where on the page to show links to preferential content, for example, as done with 'YAHOO! Shortcut' listings, such that if a query includes the term 'HONDA CIVIC', a link to YAHOO! Autos site may be provided. Other features include that advertisers may submit web pages without fully specifying bidded terms, title, abstract. Also, a listing abstract may be modified based on matches to query terms in web page content.

Figure 6:
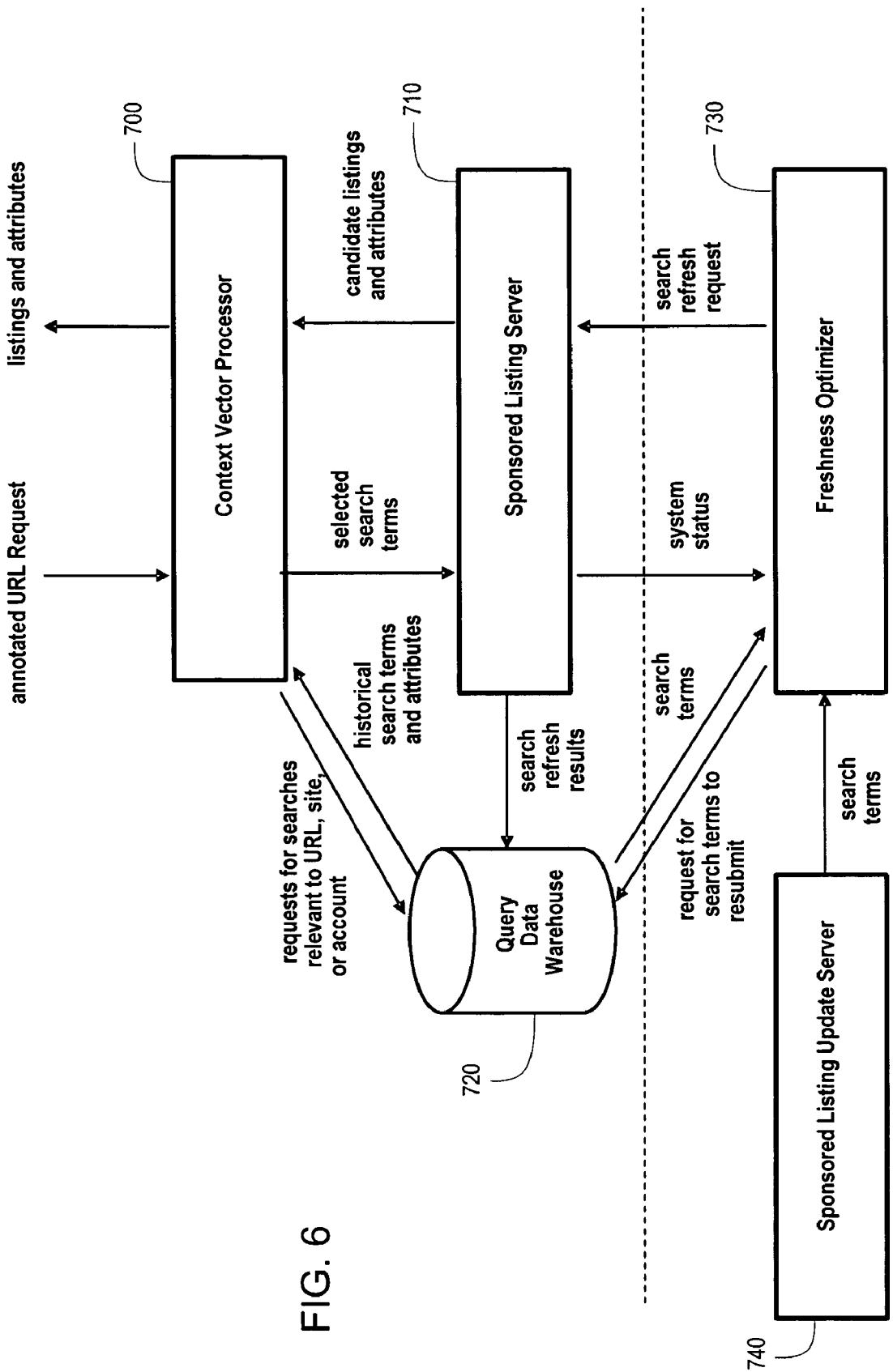
FIG. 6 is a block diagram illustrating use of the system for matching query terms and sponsored listings to arbitrary web pages.

FIG. 6 is a block diagram illustrating use of the system 100 for matching query terms and sponsored listings to arbitrary web pages. A web page provider submits one or more URLs each specifying a web page, or a root page pointing to a tree of web pages. URLs may be annotated by the web page owner with optional keywords or text to be associated with the URL. Each web page is placed in a sponsored listings database to be crawled, marshalled, tagged, and retrieved by system 100. In this way, the system 100 may be used to determine what ads are relevant for displaying on the page.

A web page owner may request listings related to a web page by sending an annotated URL request to a context vector processor 700. The request may contain a URL for the web page and may contain additional annotations about the web page and associated site, and/or annotations about the user viewing the web page, such as the user's location and recent actions. Upon a request such as annotated URL request, a context vector processor 700 may be used to request from a query data warehouse 720 a set of previous searches with results relevant to the URL, site, or account. The query data warehouse may respond by providing relevant historical search terms and attributes of the set of results associated with those search terms. The context vector processor may analyze the results from the query data warehouse 720, possibly generating additional candidate search terms, and may also generate a set of selected search terms to be submitted to a sponsored listing server 710. The sponsored listing server 710 responds with a list of candidate listings and attributes of those listings. The context vector processor 700 analyzes the set of candidate listings, determines which listings to return, optionally reranks the listings, and generates a response to the annotated URL request with listings and associated attributes, which may include the confidence of the match of each listing to the web page.

The effectiveness of listings returned by the context vector processor may be optimized by using a freshness optimizer 730, which may operate asynchronously from the flow of annotated URL requests. The freshness optimizer 730 may request from a query data warehouse 720 search terms that were previously searched, but not searched recently enough to guarantee that a newly resubmitted search would produce the same results. The freshness optimizer 730 may request from a sponsored listing update server 740 a list of search terms that were recently added to the sponsored listings database. The freshness optimizer 730 may collect the search terms from the query data warehouse 720 and/or the sponsored listing update server 740 and submit a set of search terms to the sponsored listing server 710, which will then produce fresh search results to be stored in the query data warehouse 720.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A method of generating a search result list in response to a search query from a searcher using a computer network, the method executed with a computer having a processor, the method comprising:

(a) maintaining a first database including a first plurality of search listings comprising sponsored search listings having a sponsored content;

(b) maintaining a second database including documents having a general web content;

(c) receiving, by the processor, a search query from the searcher;

(d) identifying, by the processor, from the first database a first set of search listings comprising sponsored search listings having documents generating a match with the search query, and from the second database a second set of search listings comprising general web listings having documents generating a match with the same search query as used to identify the sponsored first set of search listings;

(e) determining, by the processor, a confidence score for each listing from the first set of search listings, wherein the confidence score is determined in accordance with a relevance of each listing when compared to the listings of the second set of search listings after execution of step (d);

(f) ranking, by the processor, the sponsored first set of search listings in accordance, at least in part, with the confidence score for each search listing thereof, wherein the processor associates the sponsored first set of search listings with at least one feature different than the relevance of each search listing when compared to the listings of the second set of search listings, and the processor further orders the sponsored first set of search listings in accordance with the at least one feature, the at least one feature comprising any of a number of clicks, a click-through rate, and a conversion rate derived from historical click-through and conversion data from user activity on the sponsored first set of search listings;

(g) computing a plurality of demotion terms related to a plurality of the top-ranked sponsored first set of search listings, wherein the demotion terms capture non-ideal characteristics thereof;

(h) updating the confidence score of each of the top-ranked sponsored first set of search listings based on the plurality of demotion terms; and (i) re-ranking the top-ranked sponsored first set of search listings according to the updated confidence scores.

2. The method of claim 1, wherein each search listing is associated with one or more search terms.

3. The method of claim 2, wherein at least one of the one or more search terms associated with at least one search listing is automatically generated based on information located at a first address associated with the at least one search listing.

4. The method of claim 1, further comprising:
modifying the query before identifying the first and second sets of search listings in step (d).

5. The method of claim 1, wherein each listing from the first set of search listings is associated with a first set of attributes, each attribute of the first set of attributes associated with an attribute weight, and wherein the confidence score is determined by weighting at least one attribute for each listing with the associated attribute weight.

6. The method of claim 5, wherein the searcher is associated with a geographical region, and wherein the confidence score is determined by weighting at least one attribute for each listing with a second set of attribute weights associated with the geographical region.

7. The method of claim 1, comprising discarding at least one of the sponsored first set of search listings in accordance with a list of negative keywords.

8. The method of claim 1, wherein the confidence scores are determined using a machine-learning method.

9. A server for generating a search result list in response to a search query from a searcher using a computer network, comprising:

(a) a memory for use in storing data and instructions; and (b) a processor in communication with the memory and for enabling actions based on the stored instructions, the stored instructions including instructions for:

(i) communicating with a first database, the first database including a first plurality of search listings comprising sponsored search listings having a sponsored content;

(ii) communicating with a second database, the second database including documents having a general web content;

(iii) receiving a search query from the searcher;

(iv) identifying from the first database a first set of search listings comprising sponsored search listings having documents generating a match with the search query, and from the second database a second set of search listings comprising general web listings having documents generating a match with the same search query as used to identify the sponsored first set of search listings;

(v) determining a confidence score for each listing from the first set of search listings, wherein the confidence score is determined in accordance with a relevance of each listing when compared to the listings of the second set of search listings after execution of step (b) (iv); and (vi) ordering the identified sponsored first set of search listings in accordance, at least in part, with the confidence score for each search listing thereof, wherein the sponsored first set of search listings are associated with at least one feature different than the relevance of each search listing when compared to the listings of the second set of search listings, and the sponsored first set of search listings are further ordered in accordance with the at least one feature, the at least one feature comprising any of a number of clicks, a click-through rate, and a conversion rate derived from historical click-through and conversion data from user activity on the sponsored first set of search listings;

(vii) computing a plurality of demotion terms related to a plurality of the top-ranked sponsored first set of search listings, wherein the demotion terms capture non-ideal characteristics thereof;

(viii) updating the confidence score of each of the top-ranked sponsored first set of search listings based on the plurality of demotion terms; and (ix) re-ranking the top-ranked sponsored first set of search listings according to the updated confidence scores.

10. The server of claim 9, wherein the stored instructions further comprise instructions for
modifying the search query in a first manner for identifying the first set of search listings; and
modifying the search query in a second manner for identifying the second set of search listings.

11. The server of claim 10, wherein each listing from the first set of search listings is associated with a first set of attributes, each attribute of the first set of attributes associated with an attribute weight, and wherein the confidence score is determined by weighting at least one attribute for each listing with the associated attribute weight.

12. The server of claim 9, wherein the stored instructions further comprise instructions for:

storing the second set of search listings; and updating, automatically, the second set of search listings after a predetermined period of time.

13. The server of claim 9, wherein the first database is maintained by a first entity and the second database is maintained by a second, specific entity.

14. The server of claim 9, wherein the processor executes instructions to discard at least one of the sponsored first set of search listings in accordance with a list of negative keywords.

15. The server of claim 9, wherein each search listing is associated with one or more search terms.

16. A processor-readable medium having processor-executable code thereon for enabling and performing operations to generate a search result list in response to a search query from a searcher using a computer network, the operations comprising:

(a) maintaining a first database including a first plurality of search listings comprising sponsored search listings having a sponsored content;

(b) maintaining a second database including documents having a general web content;

(c) receiving a search query from the searcher;

(d) identifying from the first database a first set of search listings comprising sponsored search listings having documents generating a match with the search query, and from the second database a second set of search listings comprising general web listings having documents generating a match with the same search query as used to identify the sponsored first set of search listings;

(e) determining a confidence score for each listing from the first set of search listings wherein the confidence score is determined in accordance with a relevance of each listing when compared to the listings of the second set of search listings after execution of step (d); and (f) ordering the sponsored first set of search listings in accordance, at least in part, with the confidence score for each search listing thereof, wherein the sponsored first set of search listings are associated with at least one feature different than the relevance of each search listing when compared to the listings of the second set of search listings, and the sponsored first set of search listings are further ordered in accordance with the at least one feature, the at least one feature comprising any of a number of clicks, a click-through rate, and a conversion rate derived from historical click-through and conversion data from user activity on the sponsored first set of search listings;

(g) computing a plurality of demotion terms related to a plurality of the top-ranked sponsored first set of search listings, wherein the demotion terms capture non-ideal characteristics thereof;

(h) updating the confidence score of each of the top-ranked sponsored first set of search listings based on the plurality of demotion terms; and (i) re-ranking the top-ranked sponsored first set of search listings according to the updated confidence scores.

17. The processor-readable medium of claim 16, wherein the identified search listings are further ordered in accordance with a list of trademark keywords.

18. The processor-readable medium of claim 16, wherein the at least one feature is selected from the group consisting of whether a match occurred in an abstract, whether a match occurred in a display host, whether a match occurred in an algorithmically generated keyword, and whether a match occurred in an algorithmically generated summary.

19. The processor-readable medium of claim 16, wherein each search listing may be associated with one or more search terms.

20. The method of claim 1, further comprising:

optimizing placement of the search listings on a location of a search results page based on the confidence score, wherein the location comprises a top, a side, or a bottom of the search results page.

21. The method of claim 1, wherein the at least one feature further comprises a rank among a sorted set of top search listings of the sponsored first set of search listings from a combination of the sponsored first set of search listings and the second set of search listings.

22. The server of claim 10, wherein the first manner comprises giving query terms of the search query different weights for different search providers.

23. The server of claim 9, wherein the at least one feature further comprises a rank among a sorted set of top search listings of the sponsored first set of search listings from a combination of the identified search listings and the second set of search listings.

24. The method of claim 1, wherein the demotion terms comprise demotion metrics computed for: (i) a document section consisting of an abstract, a bidded term, or a list of key topics, or (ii) for whether or not the listing has been editorially reviewed.

25. The method of claim 1, wherein the at least one feature further comprises whether the search query appears in any of: a display host, an algorithmically generated keyword or summary, or a combination thereof.

26. The method of claim 9, wherein the at least one feature further comprises whether the search query appears in at least one of: a display host, an algorithmically generated keyword or summary, or a combination thereof.

* * * * *